(12) United States Patent
Hung et al.

(10) Patent No.: US 7,687,594 B2
(45) Date of Patent: Mar. 30, 2010

(54) RANDOM AMORPHOUS COPOLYMER AND MANUFACTURING METHOD THEREOF

(75) Inventors: Chi-Yuan Hung, Kaohsiung County (TW); Cheng-Hsing Fan, Taichung (TW); Yuhsin Tsai, Hsinchu (TW); Fu-Yu Tsai, Yongkang (TW)

(73) Assignee: Industrial Technology Research Institute, Hsinchu County (TW)

( * ) Notice: Subject to any disclaimer, the term of this patent is extended or adjusted under 35 U.S.C. 154(b) by 2 days.

(21) Appl. No.: 12/144,646

(22) Filed: Jun. 24, 2008

(65) Prior Publication Data

US 2009/0137768 A1  May 28, 2009

(30) Foreign Application Priority Data

Nov. 27, 2007  (TW) ............................. 96144946 A

(51) Int. Cl.
*C08G 63/18* (2006.01)
*C08G 63/00* (2006.01)

(52) U.S. Cl. ............... 528/194; 359/350; 359/352; 359/359; 359/584; 359/589; 428/411.1; 428/412; 528/190; 528/192; 528/271; 528/272

(58) Field of Classification Search ............ 359/350, 359/352, 359, 584, 589; 428/411, 412; 528/190, 528/192, 194, 271, 272
See application file for complete search history.

(56) References Cited

U.S. PATENT DOCUMENTS

| | | | |
|---|---|---|---|
| 4,939,232 A | 7/1990 | Fukuda et al. | |
| 5,340,624 A | 8/1994 | Sublett | |
| 5,534,570 A | 7/1996 | Shih et al. | |
| 5,589,126 A | 12/1996 | Shih et al. | |
| 5,725,944 A * | 3/1998 | Jones et al. | 428/336 |
| 5,824,398 A | 10/1998 | Shih | |
| 5,859,116 A | 1/1999 | Shih | |
| 6,362,306 B1 | 3/2002 | Shelby et al. | |
| 6,599,994 B2 | 7/2003 | Shelby et al. | |
| 7,008,698 B2 | 3/2006 | Marlow et al. | |
| 7,226,985 B2 * | 6/2007 | Hale et al. | 528/272 |

FOREIGN PATENT DOCUMENTS

| | | |
|---|---|---|
| EP | 0854175 B1 | 7/1998 |
| EP | 0909292 B1 | 4/1999 |
| EP | 1204694 B1 | 5/2002 |
| WO | 97/49757 A1 | 12/1997 |
| WO | 01/12697 A1 | 2/2001 |
| WO | 03/008499 A1 | 1/2003 |

* cited by examiner

*Primary Examiner*—Terressa M Boykin
(74) *Attorney, Agent, or Firm*—Pai Patent & Trademark Law Firm; Chao-Chang David Pai

(57) ABSTRACT

A random amorphous copolyester is synthesized by using diacid monomers and diol monomers. The random amorphous copolyester has a structure of the formula (I):

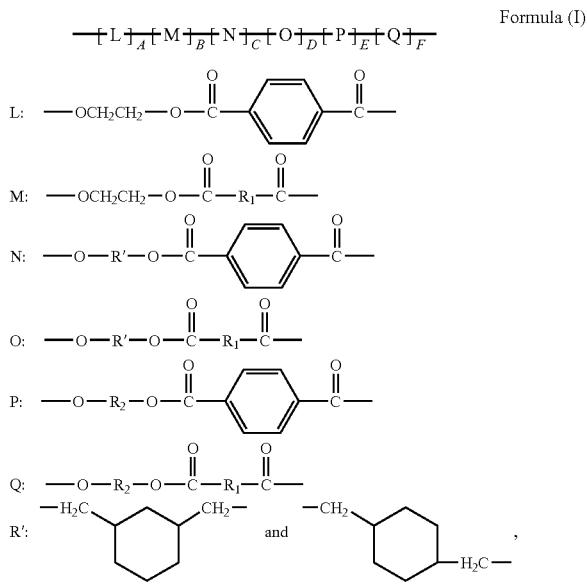

wherein $R_1$, $R_2$ is an aromatic or aliphatic monomer, A is 0-0.8, B is 0-0.8, C is 0-1, D is 0-1, E is 0-0.8, F is 0-0.8, C+D<0.2 and A+B+E+F<0.8. The diacid monomer comprises TPA and an aromatic or aliphatic diacid monomer, the diol monomer comprises EG, 1,3 and 1,4-CHDM, and an aromatic or aliphatic diol monomer.

28 Claims, 1 Drawing Sheet

RANDOM AMORPHOUS COPOLYMER AND MANUFACTURING METHOD THEREOF

CROSS REFERENCE TO RELATED APPLICATIONS

This application claims priority of Taiwan Patent Application No. 096144946, filed on Nov. 27, 2007, the entirety of which is incorporated by reference herein.

BACKGROUND OF THE INVENTION

1. Field of the Invention

The present invention relates to an amorphous copolyester, and in particular relates to an amorphous copolyester with a wide range of glass transition temperatures.

2. Description of the Related Art

Heat-shrinkable films are widely used for labeling, protection, parceling, and wrapping of glass, metal, ceramic and plastic bottles, boxes, container, and pipes. For example, heat-shrinkable films may be used as labels on food and drugs and as labels on plastic containers such as soft drink bottles. In general, shrink films are classified into two categories: (1) biaxially oriented films for wrapping, wherein the film shrinks in both the x-and y-axis directions; and (2) uniaxially oriented films, wherein the film primarily shrinks in a stretched or oriented direction and has a little shrinkage in the non-stretched or non-oriented direction.

Although shrink films may be made of polystyrene (OPS), polyethylene, polypropylene, and polyesters, the common shrink film is made of polyvinylchloride (PVC). PVC has good heat-shrinkable properties, however PVC is not suitable for low temperature shrink packaging. Moreover, the incineration of PVC generates hydrogen chloride which causes corrosion of the incinerator and environmental pollution. In addition, the specific gravity of PVC and PET both are 1.33, and thus it is hard to separate the two materials. Therefore, amorphous copolyester has been developed to replace PVC.

At present, copolyester polymer (PETG), from the Eastman Kodak company, polymerized by 1,4-cyclohexanedimethanol monomer is the main amorphous copolyester used. However, this kind of amorphous copolyester cannot effectively shrink at higher temperatures. Therefore, an amorphous copolyester with a wide shrink temperature range is needed.

BRIEF SUMMARY OF THE INVENTION

The invention provides a random amorphous copolyester, comprising a copolyester polymerized by a diacid monomer and a diol monomer and represented by formula (I):

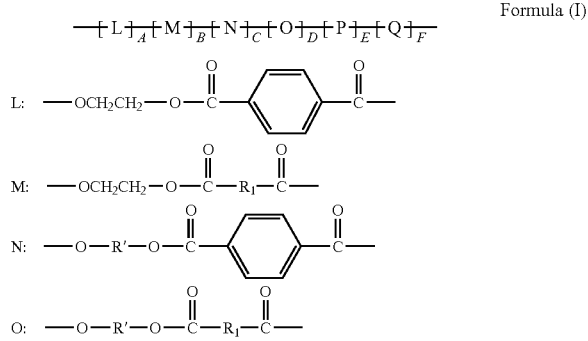

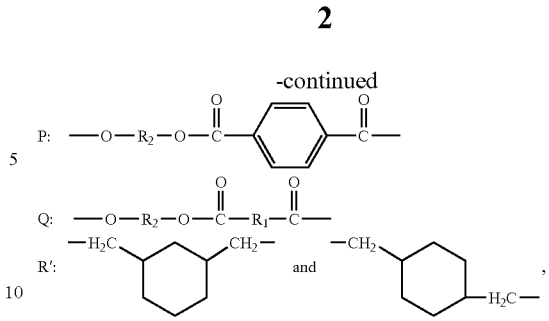

, wherein each $R_1$ and $R_2$, independently, is a bivalent aromatic or aliphatic group, wherein A, B, C, D, E and F are numbers of repeating units, A is 0-0.8, B is 0-0.8, C is 0-1, D is 0-1, E is 0-0.8, F is 0-0.8, C+D<0.2 and A+B+E+F<0.8, and wherein the diacid monomer comprises terephthalic acid (TPA) and an aromatic or aliphatic diacid monomer, and the diol monomer comprises ethylene glycol (EG), 1,3 and 1,4-cyclohexanedimethanol (1,3 and 1,4-CHDM), and an aromatic or aliphatic diol monomer.

The invention further provides a method for forming a random amorphous copolyester, comprising: providing a mixture of terephthalic acid (TPA), ethylene glycol (EG), 1,3 and 1,4-cyclohexanedimethanol (1,3 and 1,4-CHDM) and an aromatic or aliphatic monomer, wherein the aromatic monomer comprises an aromatic diacid monomer or an aromatic diol monomer, and the aliphatic monomer comprises an aliphatic diacid monomer or an aliphatic diol monomer; and subjecting the mixture to esterification and polycondensation to form the random amorphous copolyester, wherein the terephthalic acid (TPA) and the aromatic diacid monomer or aliphatic diacid monomer are diacid monomers, and the ethylene glycol (EG), 1,3 and 1,4-cyclohexanedimethanol (1,3 and 1,4-CHDM) and the aromatic diol monomer or aliphatic diol monomer are diol monomer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
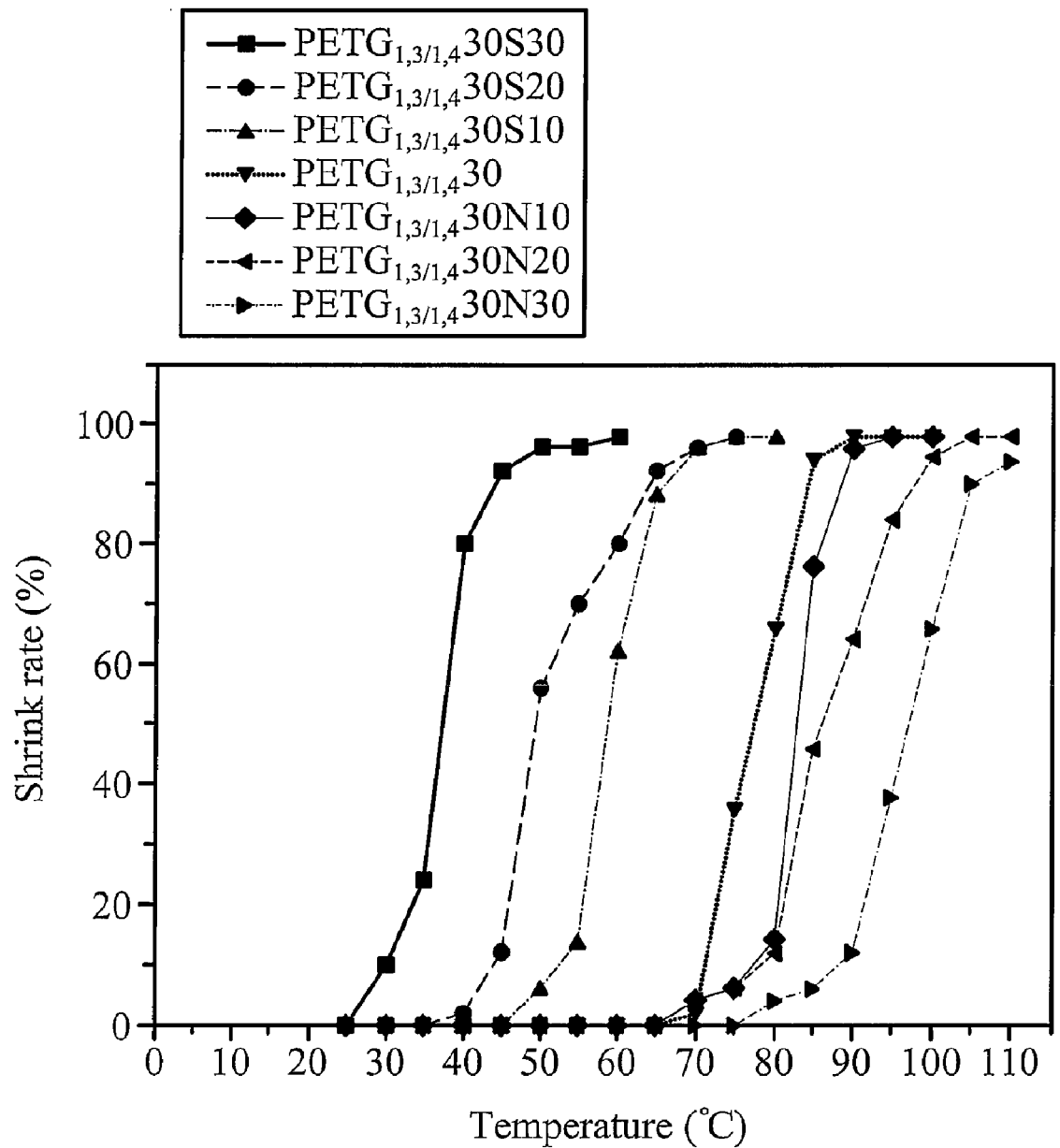
FIG. 1 shows the shrink temperature and shrink rate of the amorphous copolyesters of Examples 1 and 2.

The following description is of the best-contemplated mode of carrying out the invention. This description is made for the purpose of illustrating the general principles of the invention and should not be taken in a limiting sense. The scope of the invention is best determined by reference to the appended claims.

The invention provides a random amorphous copolyester represented by formula (I) with a wide range of glass transition temperature and heat-shrink temperature:

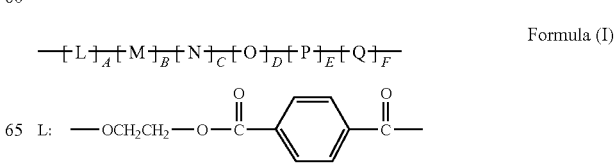

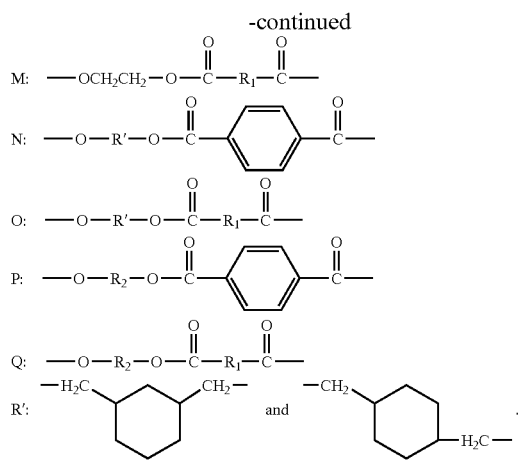

The random amorphous copolyester is polymerized by a diacid monomer and a diol monomer, wherein each $R_1$ and $R_2$ independently is a bivalent aromatic or aliphatic group and as formula (I) shows, $R_1$ is connected with two hydroxyl groups and $R_2$ is connected with two carboxyl groups. A, B, C, D, E and F are numbers of repeating units, wherein the ratio of A, B, C, D, E and F depends on the adding amount of each diacid monomer and diol monomer. Furthermore, A is 0-0.8, B is 0-0.8, C is 0-1, D is 0-1, E is 0-0.8, F is 0-0.8, C+D>0.2 and A+B+E+F<0.8.

The diol monomer comprises ethylene glycol (EG), 1,3 and 1,4-cyclohexanedimethanol (1,3 and 1,4-CHDM), and an aromatic or aliphatic diol monomer. Ethylene glycol (EG), 1,3 and 1,4-cyclohexanedimethanol (1,3 and 1,4-CHDM) and aromatic or aliphatic diol monomers are present in an amount of 0-80 mole %, 20-100 mole % and 0-80 mole %, respectively, based on 100 mole % of the diol monomer. The aromatic diol monomer may comprises 2,2-bis(4-hydroxyphenyl)propane (also named Bisphenol A), 1,1-bis(4-hydroxyphenyl)cyclohexane (also named Bisphenol Z) or 4,4-biphenol. The aliphatic diol monomer may comprise propylene glycol, butylene glycol, polyethylene glycol or polytetramethylene glycol (PTMO).

In one embodiment, the diacid monomer comprises terephthalic acid (TPA) and an aromatic diacid monomer. The aromatic diacid monomer comprises, but is not limited to, dimethyl-2,6-naphthalenedicaboxylate (NDC), 2,6-naphthoic acid, 2,7-naphthoic acid, 1,4-naphthoic acid, dimethyl-2,7-naphthalenedicaboxylate, dimethyl-2,3-naphthalenedicaboxylate, isoterephthalic acid (IPA) or the like. Furthermore, the aromatic diacid monomer is present in an amount of 0-100 mole %, based on 100 mole % of the diacid monomer.

In other embodiments, the diacid monomer comprises terephthalic acid (TPA) and an aliphatic diacid monomer comprises, but is not limited to succinic acid (SA), malonic acid, adipic acid or the like. Furthermore, the aliphatic diacid monomer is present in an amount of 0-100 or 0-40 mole %, based on 100 mole % of the diacid monomer.

The random amorphous copolyester of the invention has a wide glass transition temperature and heat-shrink temperature. For example, the wide glass transition temperature thereof may be between −20° C. and 150° C., preferably 40-120° C. and the intrinsic viscosity thereof is greater than 0.5 dL/g, preferably 0.6-0.75 dL/g.

The random amorphous copolyester of the invention may be used to prepare a container, a food container, a cosmetics container, a drug container, a planking and a film. Because the random amorphous copolyester of the invention has a wide glass transition temperature, the application range of the container, planking and film mentioned above, may be extended.

The invention also provides a film comprising a random amorphous copolyester composed of a diacid monomer and a diol monomer having a structure of Formula (I).

The definitions of $R_1$ and $R_2$ are the same with the aforementioned embodiment. A, B, C, D, E and F are numbers of repeating units, wherein the ratio of A, B, C, D, E and F depends on the adding amount of each diacid monomer and diol monomer. Furthermore, A is 0-0.8, B is 0-0.8, C is 0-1, D is 0-1, E is 0-0.8, F is 0-0.8, C+D>0.2 and A+B+E+F<0.8. The film may be used as a packaging material or shrink film.

The invention further provides a method for forming a random amorphous copolyester, comprising: providing a mixture of terephthalic acid (TPA), ethylene glycol (EG), 1,3 and 1,4-cyclohexanedimethanol (1,3 and 1,4-CHDM) and an aromatic or aliphatic monomer; and subjecting the mixture to esterification and polycondensation to form the random amorphous copolyester.

As mentioned above, the aromatic monomer comprises an aromatic diacid monomer or an aromatic diol monomer. The aromatic diacid monomer comprises dimethyl-2,6-naphthalenedicaboxylate (NDC), 2,6-naphthoic acid, 2,7-naphthoic acid, 1,4-naphthoic acid, dimethyl-2,7-naphthalenedicaboxylate, dimethyl-2,3-naphthalenedicaboxylate or isoterephthalic acid (IPA). The aromatic diol monomer may comprises 2,2-bis(4-hydroxyphenyl)propane (also named Bisphenol A), 1,1-bis(4-hydroxyphenyl)cyclohexane (also named Bisphenol Z) or 4,4-biphenol.

The aliphatic monomer comprises an aliphatic diacid monomer or an aliphatic diol monomer. The aliphatic diacid monomer comprises succinic acid (SA), malonic acid, or adipic acid. The aliphatic diol monomer may comprise propylene glycol, butylene glycol, polyethylene glycol or polytetramethylene glycol (PTMO).

Furthermore, terephthalic acid (TPA) and the aromatic diacid monomer or aliphatic diacid monomer are diacid monomers, and the ethylene glycol (EG), 1,3 and 1,4-cyclohexanedimethanol (1,3 and 1,4-CHDM) and the aromatic diol monomer or aliphatic diol monomer are diol monomers.

The reaction temperature of the esterification may be 220-250° C. and the reaction temperature of the polycondensation may be 250-280° C. In the invention, a polycondensation catalyst may be added into the mixture during polycondensation, wherein the polycondensation catalyst may comprise an antimony based, germanium based, tin based, gallium based, or aluminum based metal catalyst or combinations thereof, preferably, an antimony acetate or an alloy of titanium and antimony. The content of the polycondensation catalyst in the mixture may be about 25-500 ppm.

In one embodiment, the catalysts used in the esterification and the polycondensation are the same. In other embodiments, the catalysts used in the esterification and used in the polycondensation are different from each other. The catalysts, reaction temperature and reaction time are the same with well known techniques without special limitation and one skilled in the art may choose different reaction parameters depending on different needs.

EXAMPLE

Example 1

$PETG_xN_y$

The structure of the amorphous copolyester of Example 1 is represented by formula (II):

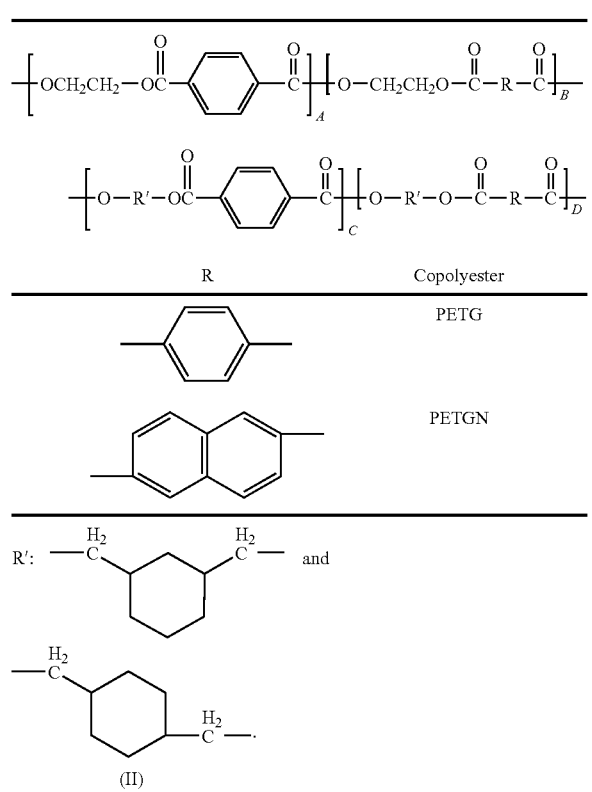

The amorphous copolyester of Example 1 was polymerized by two kinds of diacid monomers and two kinds of diol monomers. The two kinds of diacid monomers comprise terephthalic acid (TPA) and dimethyl-2,6-naphthalenedicaboxylate (NDC) and the two kinds of diol monomers comprised ethylene glycol (EG) and 1,3 and 1,4-cyclohexanedimethanol (1,3 and 1,4-CHDM) (Dow Chemical Company, UNOXOL™ 34 Diol). The mole % of terephthalic acid (TPA), dimethyl-2,6-naphthalenedicaboxylate (NDC), ethylene glycol (EG) and 1,3 and 1,4-cyclohexanedimethanol (1,3 and 1,4-CHDM) are shown in Table 1. As shown in Table 1, the glass transition temperature of the copolyester was changed by adjusting the content of dimethyl-2,6-naphthalenedicaboxylate (NDC). For example, when the content of dimethyl-2,6-naphthalenedicaboxylate (NDC) was higher, the glass transition temperature of the copolyester was higher. The diacid monomers and diol monomers were polymerized to form the copolyester of Example 1 through esterification and then polycondensation and during polycondensation, 350 ppm of tetrabutyl titanate or antimony acetate was added into the mixture of the diacid monomers and diol monomers.

The synthetic scheme of the amorphous copolyester of Example 1 is shown in the following:

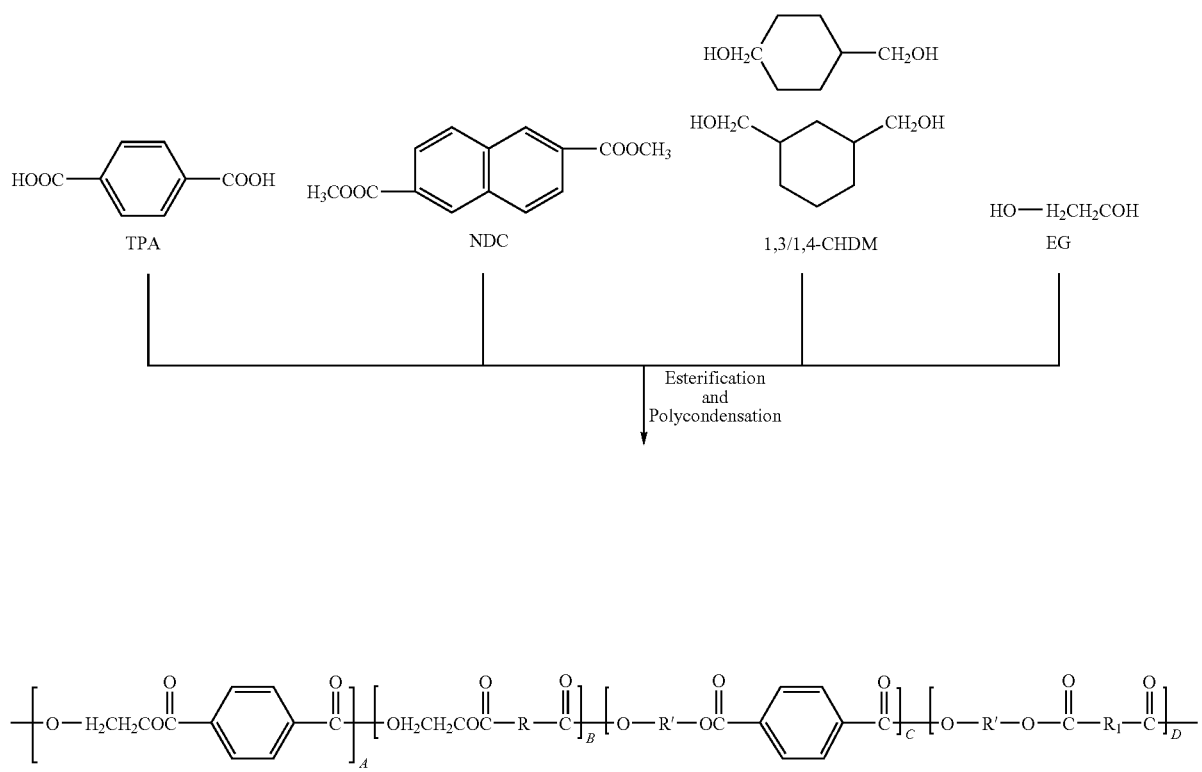

| R | Copolyester |
|---|---|
| 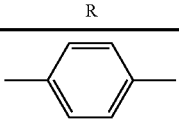 | PETG |
| 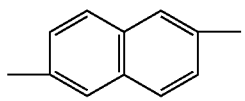 | PETGN |

R': 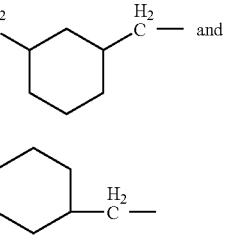 and 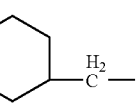

TABLE 1

The properties of amorphous copolyester of Example 1

| Copolyester | T | N | E | C | Intrinsic viscosity (dL/g) | Tg (° C.) | Tm (° C.) |
|---|---|---|---|---|---|---|---|
| | | (mole %) | | | | | |
| PETG$_{1,3/1,4}$30 | 100 | 0 | 70 | 30 | 0.73 | 77 | — |
| PETG$_{1,3/1,4}$30N10 | 90 | 10 | 70 | 30 | 0.71 | 80 | — |
| PETG$_{1,3/1,4}$30N20 | 80 | 20 | 70 | 30 | 0.73 | 84 | — |
| PETG$_{1,3/1,4}$30N30 | 70 | 30 | 70 | 30 | 0.73 | 87 | — |
| PETG$_{1,3/1,4}$30N40 | 60 | 40 | 70 | 30 | 0.65 | 91 | — |
| PENG$_{1,3/1,4}$30 | 0 | 100 | 70 | 30 | 0.71 | 111 | — |
| PENG$_{1,3/1,4}$100 | 0 | 100 | 0 | 100 | 0.70 | 110 | — |

T: terephthalic acid (TPA)
N: dimethyl-2,6-naphthalenedicaboxylate (NDC)
C: 1,3 and 1,4-cyclohexanedimethanol (1,3 and 1,4-CHDM)
E: ethylene glycol (EG)
Tg: glass transition temperature
Tm: melting temperature

Example 2

PETG$_x$S$_y$

The structure of the amorphous copolyester of Example 2 is represented by formula (III):

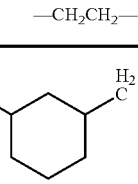

| R | Copolyester |
|---|---|
| 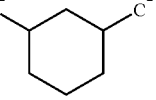 | PETG |
| —CH$_2$CH$_2$— | PETGS |

R':  and (III)

The amorphous copolyester of Example 2 was polymerized by two kinds of diacid monomers and two kinds of diol monomers. The two kinds of diacid monomer comprise terephthalic acid (TPA) and succinic acid (SA) and the two kinds of diol monomer comprised ethylene glycol (EG) and 1,3 and 1,4-cyclohexanedimethanol (1,3 and 1,4-CHDM) (Dow Chemical Company, UNOXOL™ 34 Diol). The mole % of terephthalic acid (TPA), succinic acid (SA), ethylene glycol (EG) and 1,3 and 1,4-cyclohexanedimethanol (1,3 and 1,4-CHDM) are shown in Table 2. As shown in Table 2, the glass transition temperature of the copolyester was changed by adjusting the content of succinic acid (SA). For example, when the content of succinic acid (SA) was higher, the glass transition temperature of the copolyester was lower. The diacid monomers and diol monomers were polymerized to form the copolyester of Example 1 through esterification and then polycondensation and during polycondensation, 350 ppm of tetrabutyl titanate or antimony acetate was added into the mixture of the diacid monomers and diol monomers.

The synthetic scheme of the amorphous copolyester of Example 2 is shown in the following:

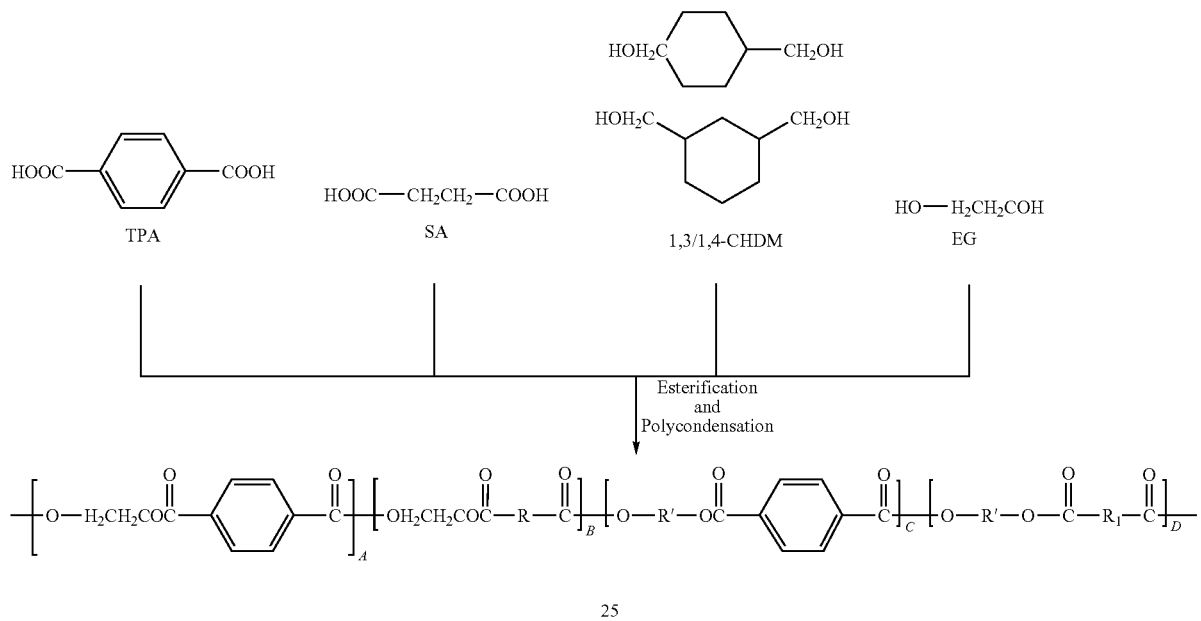

| | R | Copolyester |
|---|---|---|
| | (para-phenylene) | PETG |
| | $-CH_2CH_2-$ | PETGS |

R': $-CH_2-$(1,3-cyclohexyl)$-CH_2-$ and $-CH_2-$(1,4-cyclohexyl)$-CH_2-$

TABLE 1

The properties of amorphous copolyester of Example 2

| Copolyester | T | S | E | C | Intrinsic viscosity (dL/g) | Tg (°C.) | Tm (°C.) |
|---|---|---|---|---|---|---|---|
| | (mole %) | | | | | | |
| $PETG_{1,3/1,4}30$ | 100 | 0 | 70 | 30 | 0.73 | 77 | — |
| $PETG_{1,3/1,4}30S10$ | 90 | 10 | 70 | 30 | 0.65 | 65 | — |
| $PETG_{1,3/1,4}30S20$ | 80 | 20 | 70 | 30 | 0.67 | 52 | — |
| $PETG_{1,3/1,4}30S30$ | 70 | 30 | 70 | 30 | 0.65 | 44 | — |
| $PETG_{1,3/1,4}30S40$ | 60 | 40 | 70 | 30 | 0.73 | 37 | — |

T: terephthalic acid (TPA)
S: succinic acid (SA)
C: 1,3 and 1,4-cyclohexanedimethanol (1,3 and 1,4-CHDM)
E: ethylene glycol (EG)
Tg: glass transition temperature
Tm: melting temperature Example 3

Shrink Test

The copolyesters of Example 1 and 2 were cut into suitable sizes and stretched at 10-20° C. higher than their glass transition temperature with two times a stretching ratio. After stretching, the copolyesters were put into different ovens with different temperatures for 5 minutes to calculate the shrink rate thereof and the results were shown in FIG. 1. The definition of the shrink rate is shown in the following.

Shrink rate(%):

$$= \frac{l - l_0}{2l_0 - l_0} \times 100\% = \frac{l - l_0}{l_0} \times 100\%,$$

wherein l is the length of the sample after being treating with heat and $l_0$ is the original sample length.

As FIG. 1 shows, succinic acid (SA) and dimethyl-2,6-naphthalenedicaboxylate (NDC) with different concentrations changed the shrink temperature of the copolyesters of Examples 1 and 2.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A random amorphous copolyester, comprising a copolyester polymerized by esterifying and polycondensing a mixture of a diacid monomer and a diol monomer and represented by formula (I):

$$-[L]_A-[M]_B-[N]_C-[O]_D-[P]_E-[Q]_F- \quad \text{Formula (I)}$$

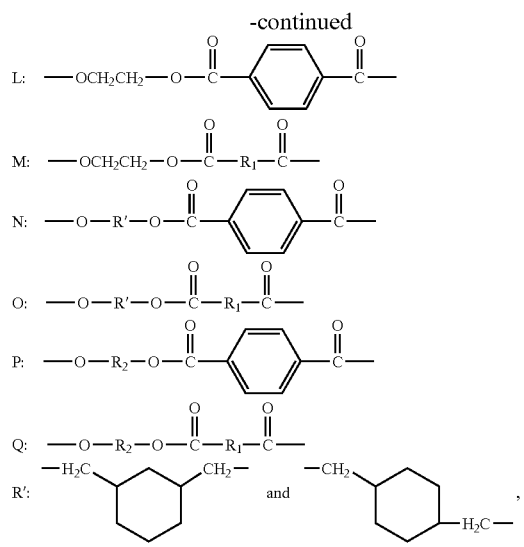

wherein each of R1 and R2, independently, is a bivalent aromatic or aliphatic group, wherein A, B, C, D, E and F are numbers of repeating units, A is 0-0.8, B is 0-0.8, C is 0-1, D is 0-1, E is 0-0.8, F is 0-0.8, C+D>0.2 and A+B+E+F<0.8, wherein the diacid monomer comprises terephthalic acid (TPA) and an aromatic or aliphatic diacid monomer, and the diol monomer comprises ethylene glycol (EG), 1,3 and/or 1,4-cyclohexanedimethanol (1,3 and 1,4-CHDM), and an aromatic or aliphatic diol monomer, and wherein 1,3 and 1,4-cyclohexanedimethanol (1,3 and 1,4-CHDM) is present in an amount of 20-100 mole %, based on 100 mole % of the diol monomer.

2. The random amorphous copolyester as claimed in claim 1, wherein the aromatic diacid monomer comprises dimethyl-2,6-naphthalenedicaboxylate (NDC), 2,6-naphthoic acid, 2,7-naphthoic acid, 1,4-naphthoic acid, dimethyl-2,7-naphthalenedicaboxylate, dimethyl-2,3-naphthalenedicaboxylate or isoterephthalic acid (IPA)

3. The random amorphous copolyester as claimed in claim 1, wherein the aliphatic diacid monomer comprises succinic acid (SA), malonic acid or adipic acid.

4. The random amorphous copolyester as claimed in claim 1, wherein the aromatic diol monomer comprises 2,2-bis (4-hydroxyphenyl)propane, 1,1-bis (4-hydroxyphenyl) cyclohexane or 4,4-biphenol.

5. The random amorphous copolyester as claimed in claim 1, wherein the aliphatic diol monomer comprises propylene glycol, butylene glycol, polyethylene glycol or polytetramethylene glycol (PTMO).

6. The random amorphous copolyester as claimed in claim 1, wherein the aromatic diacid monomer is present in an amount of 0-100 mole %, based on 100 mole % of the diacid monomer.

7. The random amorphous copolyester as claimed in claim 1, wherein the aliphatic diacid monomer is present in an amount of 0-100 mole %, based on 100 mole % of the diacid monomer.

8. The random amorphous copolyester as claimed in claim 1, wherein the aromatic or aliphatic diol monomer is present in an amount of 0-80 mole %, based on 100 mole % of the diol monomer.

9. The random amorphous copolyester as claimed in claim 1, wherein a glass transition temperature of the random amorphous copolyester is between −20° C. and 150° C.

10. The random amorphous copolyester as claimed in claim 1, wherein an intrinsic viscosity of the random amorphous copolyester is greater than 0.5 dL/g.

11. A film comprising a random amorphous copolyester polymerized by esterifying and polycondensing a mixture of a diacid monomer and a diol monomer and represented by formula (I)

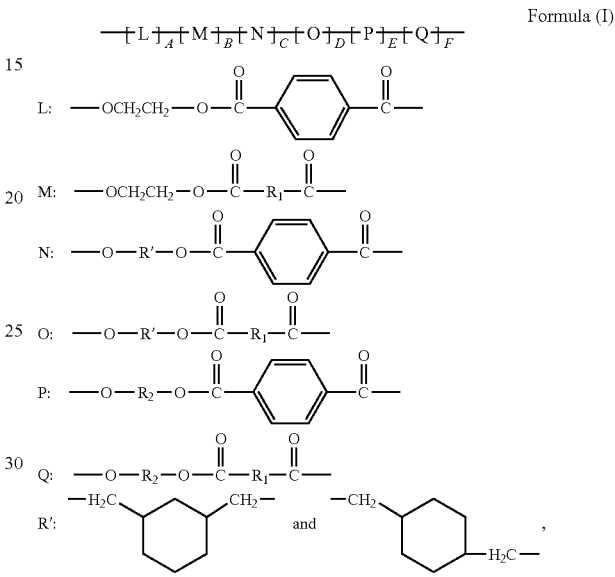

Formula (I)

wherein R1, R2 is an aromatic or aliphatic monomer, wherein A, B, C, D, E and F are numbers of repeating units, A is 0-0.8, B is 0-0.8, C is 0-1, D is 0-1, E is 0-0.8, F is 0-0.8, C+D<0.2 and A+B+E+F<0.8, wherein the diacid monomer comprises terephthalic acid (TPA) and an aromatic or aliphatic diacid monomer, the diol monomer comprises ethylene glycol (EG), 1,3 and 1,4-cyclohexanedimethanol (1,3 and 1,4-CHDM), and an aromatic or aliphatic diol monomer, and wherein 1,3 and 1,4-cyclohexanedimethanol (1,3 and 1,4-CHDM) is present in an amount of 20-100 mole %, based on 100 mole % of the diol monomer.

12. The film as claimed in claim 11, wherein the aromatic diacid monomer comprises dimethyl-2,6-naphthalenedicaboxylate (NDC), 2,6-aphthoic acid, 2,7-naphthoic acid, 1,4-naphthoic acid, dimethyl-2,7-naphthalenedicaboxylate, Dimethyl-2,3-naphthalenedicaboxylate or isoterephthalic acid (IPA)

13. The film as claimed in claim 11, wherein the aliphatic diacid monomer comprises succinic acid (SA), malonic acid or adipic acid.

14. The film as claimed in claim 11, wherein the aromatic diol monomer comprises 2,2-Bis(4-hydroxyphenyl)propane, 1,1-Bis (4-hydroxyphenyl) cyclohexane or 4,4-Biphenol.

15. The film as claimed in claim 11, wherein the aliphatic diol monomer comprises propylene glycol, butylene glycol, polyethylene glycol or polytetramethylene glycol (PTMO)

16. The film as claimed in claim 11, wherein the aromatic diacid monomer is present in an amount of 0-100 mole %, based on 100 mole % of the diacid monomer.

17. The film as claimed in claim 11, wherein the aliphatic diacid monomer is present in an amount of 0-100 mole %, based on 100 mole % of the diacid monomer.

18. The film as claimed in claim 11, wherein the aromatic or aliphatic diol monomer is present in an amount of 0-80 mole %, based on 100 mole % of the diol monomer.

19. The film as claimed in claim 11, wherein the film is a shrink film or a packaging material.

20. A method for forming a random amorphous copolyester, comprising:
providing a mixture of terephthalic acid (TPA), ethylene glycol (EG), 1,3 and 1,4-cyclohexanedimethanol (1,3 and 1,4-CHDM) and an aromatic or aliphatic monomer, wherein the aromatic monomer comprises an aromatic diacid monomer or aromatic diol monomer, and the aliphatic monomer comprises an aliphatic diacid monomer or aliphatic diol monomer, wherein the terephthalic acid (TPA) and the aromatic diacid monomer or aliphatic diacid monomer are diacid monomers, and the ethylene glycol (EG), 1,3 and 1,4-cyclohexanedimethanol (1,3 and 1,4-CHDM) and the aromatic diol monomer or aliphatic diol monomer are diol monomers and wherein 1,3 and 1,4-cyclohexanedimethanol (1,3 and 1,4-CHDM) is present in an amount of 20-100 mole %, based on 100 mole % of the diol monomer; and
subjecting the mixture to esterification and polycondensation to form the random amorphous copolyester, wherein the temperature used for esterification is 220-250° C. and the temperature used for polycondensation is 250-280° C.

21. The method as claimed in claim 20, wherein the aromatic or aliphatic diacid monomer is present in an amount of 0-100 mole %, based on 100 mole % of the diacid monomer.

22. The method as claimed in claim 20, wherein the aromatic or aliphatic diol monomer is present in an amount of 0-80 mole %, based on 100 mole % of the diol monomer.

23. The method as claimed in claim 20, wherein the aromatic monomer comprises dimethyl-2,6-naphthalenedicaboxylate (NDC), 2,6-naphthoic acid, 2,7-naphthoic acid, 1,4-naphthoic acid, dimethyl-2,7-naphthalenedicaboxylate, dimethyl-2,3-naphthalenedicaboxylate, isoterephthalic acid (IPA), 2,2-Bis (4-hydroxyphenyl)propane, 1,1-Bis (4-hydroxyphenyl)cyclohexane or 4,4-Biphenol.

24. The method as claimed in claim 20, wherein the aliphatic monomer comprises succinic acid (SA), malonic acid, adipic acid, propylene glycol, butylene glycol, polyethylene glycol or polytetramethylene glycol (PTMO)

25. The method as claimed in claim 20, wherein the step of subjecting the mixture to polycondensation, further comprises adding a polycondensation catalyst.

26. The method as claimed in claim 25, wherein the polycondensation catalyst comprises an antimony based, germanium based, tin based, gallium based, or aluminum based metal catalyst or combinations thereof.

27. The random amorphous copolyester as claimed in claim 1, wherein the temperature for esterifying the mixture is 220-250° C. and the temperature for polycondensing the mixture is 250-280° C.

28. The film as claimed in claim 11, wherein the temperature for esterifying the mixture is 220-250° C. and the temperature for polycondensing the mixture is 250-280° C.

* * * * *